United States Patent [19]

Rubin et al.

[11] 4,331,643
[45] May 25, 1982

[54] USE OF DIAZOBICYCLOOCTANE (DABCO) AS A TEMPLATE IN ZEOLITE SYNTHESIS

[75] Inventors: Mae K. Rubin, Bala Cynwyd, Pa.; Edward J. Rosinski, Pedricktown, N.J.

[73] Assignee: Mobil Oil Corporation, New York, N.Y.

[21] Appl. No.: 216,351

[22] Filed: Dec. 15, 1980

[51] Int. Cl.$^3$ .................. C01B 33/28; C07F 5/06; B01J 31/14

[52] U.S. Cl. .................. 423/329; 252/188.3 R; 252/431 N; 544/225

[58] Field of Search ................ 423/328–330; 252/431 N, 455 Z, 188.3 R; 544/225, 229

[56] References Cited

U.S. PATENT DOCUMENTS 3,459,676  8/1969  Kerr ............................ 423/329 X
3,578,723  5/1971  Bowes et al. ................. 260/672
3,642,434  2/1972  Dwyer ......................... 23/113
3,716,596  2/1973  Bowes .......................... 260/671 C
3,923,639 12/1975  Ciric ............................ 208/111
4,021,447  5/1977  Rubin .......................... 423/329 X
4,139,600  2/1979  Rollmann et al. .......... 423/329
4,241,036 12/1980  Flanigen et al. ............ 423/329 X

FOREIGN PATENT DOCUMENTS 702248  8/1967  Belgium .

Primary Examiner—Edward J. Meros
Attorney, Agent, or Firm—Charles A. Huggett; Michael G. Gilman; Stanislaus Aksman

[57] ABSTRACT

A process for preparing a ZSM-4 type crystalline zeolite material wherein 1,4-diazobicyclo (2.2.2) octane (DABCO), triethylenediamine (TED) is used as the source of an organic cation.

2 Claims, No Drawings

USE OF DIAZOBICYCLOOCTANE (DABCO) AS A TEMPLATE IN ZEOLITE SYNTHESIS

BACKGROUND OF THE INVENTION

1. Field of the Invention

This invention relates to a process for preparing crystalline zeolitic materials from organic diamines. More particularly, this invention relates to an improved process for preparing crystalline zeolite materials of the ZSM-4 type from a reaction mixture containing triethylenediamine.

2. Description of Prior Art

Zeolitic materials, both natural and synthetic, have been demonstrated in the past to have catalytic activity for various types of hydrocarbon conversion reactions, particularly for catalytic cracking. Some of these zeolitic materials comprise ordered, porous crystalline aluminosilicates having a definite crystalline structure, as determined by X-ray diffraction, which contain a large number of small cavities interconnected by a series of still smaller channels or pores. These cavities or pores are precisely uniform in size for a given zeolitic material. Since the size of these pores is such that they adsorb molecules of certain dimensions, while reject those of larger dimensions, these materials are known in the art as "molecular sieves" and are utilized in a variety of processes which take advantage of the selectively adsorptive properties of these materials.

These zeolitic molecular sieves include a variety of positive ion-containing crystalline aluminosilicates, both natural and synthetic. Such aluminosilicates are generally described as having a rigid three-dimensional network of $SiO_4$ and $AlO_4$ tetrahedra in which the tetrahydra are cross-linked by the sharing of oxygen atoms whereby the ratio of the total aluminum and silicon atoms to oxygen atoms is 1:2. The electrovalence of the tetrahydra containing aluminum is negatively charged and the composition is balanced by the inclusion in the crystal structure of a cation, for example an alkali metal or an alkaline earth metal cation. Thus, e.g., a univalent positive sodium cation balances one negatively charged aluminosilicate tetrahydra. Conversely, if an alkaline earth metal cation, e.g., calcium or strontium, is employed in the crystal structure of an aluminosilicate, it balances two negatively charged aluminosilicate tetrahydra due to its doubly positive valance. Some compositions of the aluminosilicate family can contain both double positive cations, e.g., calcium, and univalent positive cations, e.g., sodium, and can be prepared in a conventional manner by base exchanging a sodium aluminosilicate with a calcium compound solution in such a manner that not all of the sodium ions are removed. Such cation exchange enables those skilled in the art to vary the size of the pores in a given aluminosilicate by suitable selection of the particular cation. The spaces between the tetrahydra are usually occupied by molecules of water prior to dehydration.

One of the crystalline zeolites known in the art is identified as ZSM-4. The ZSM-4 zeolite is usually employed for the isomerization and disproportionation of aromatic hydrocarbons. This particular catalyst has been found to be exceptionally selective in the isomerization of aromatics, such as xylene, or the disproportionation of alkylbenzenes, such as toluene. It is known that the ZSM-4 zeolite will form only if the reaction mixture contains a source of an organic nitrogen. More particularly, it was believed in the prior art that ZSM-4 can be produced only in the presence of tetramethylammonium cations, as described by J. Ciric in U.S. Pat. No. 3,923,639 and by Bowes et al, in U.S. Pat. No. 3,578,723. (The entire contents of both of these patents are incorporated herein by reference). The source of an organic cation used in an Omega zeolite catalyst, a catalyst analogous to the ZSM-4 zeolite, was more broadly expanded to include ammonium and alkylammonium groups, as described by Flanigen et.al., in Belgian Pat. No. 702,248. In a more recent advancement in the art, Rubin, et. al., in U.S. Pat. No. 4,021,447 showed that choline chloride and pyrrolidine could also be used as sources of organic cations in the ZSM-4 synthesis.

Thus, the prior art processes producing the ZSM-4 zeolite or zeolites similar thereto have been limited to the use of tetramethylammonium cations or amines containing one nitrogen atom. The use of DABCO has not heretofore been contemplated in the synthesis of ZSM-4 zeolites or zeolites whose physical and/or chemical characteristics are similar to those of ZSM-4.

Accordingly, it is the primary object of the present invention to provide a process for the production of a ZMS-4 type crystalline zeolitic material, whose composition and physical and/or chemical characteristics are essentially those of ZSM-4, wherein a DABCO is used in the synthesis thereof.

Additional objects of this invention will become apparent to those skilled in the art from the study of the specification and of the appended claims.

SUMMARY OF THE INVENTION

In accordance with the present invention there is provided an improved process for preparing a ZMS-4 type of crystalline zeolite material, comprising crystallizing the material from a silica and alumina reaction mixture containing an organic diamine, such as triethylenediamine (TED), also known in the art as 1,4-diazabicyclo (2.2.2) octane (DABCO-a registered trademark of Air Products & Chemicals, Inc.). The ZSM-4 type crystalline zeolite produced in the process of this invention has an X-ray difraction pattern similar to that of the ZSM-4 zeolite and it is made from a gel formulation whose composition, in terms of the ratio of oxides of individual ingredients, falls within the range used in the prior art processes for the production of ZSM-4.

DETAILED DESCRIPTION OF THE INVENTION

ZSM-4 type compositions can be identified in terms of mole ratios of oxides as follows:

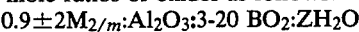

wherein M is a cation, n is the valence of said cation, A is selected from the group consisting of aluminum and gallium, B is selected from the group consisting of silicon and germanium, and z is from 0 to 20.

The ZSM-4 type of zeolite in the as-synthesized form has the formula, in terms of mole ratios of oxides as follows:

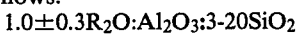

wherein R is derived from DABCO.

The term ZSM-4 type crystalline zeolite is used herein to include all species of ZSM-4 zeolite before and/or after various ion exchange treatments. It will be apparent to those skilled in the art that this term also includes the aforementioned species of ZSM-4 zeolite which may contain trace amounts of impurities commonly present in zeolites, e.g., mordenite and phillipsite.

The ZSM-4 type crystalline zeolite material has a definite distinguishing structure whose X-ray diffraction pattern in the as-synthesized form, has the following values:

TABLE 1

| Interplanar Spacing d(A) | Relative Intensity I/I$_o$ |
|---|---|
| 9.10 ± 0.20 | VS |
| 7.94 ± 0.10 | M |
| 6.90 ± 0.10 | S |
| 5.97 ± 0.07 | M-S |
| 5.50 ± 0.05 | W |
| 5.27 ± 0.05 | M |
| 4.71 ± 0.05 | S |
| 4.39 ± 0.05 | W |
| 3.96 ± 0.05 | W |
| 3.80 ± 0.05 | VS |
| 3.71 ± 0.05 | S |
| 3.63 ± 0.05 | S |
| 3.52 ± 0.05 | VS |
| 3.44 ± 0.05 | M |
| 3.16 ± 0.05 | VS |
| 3.09 ± 0.05 | M |
| 3.04 ± 0.05 | M |
| 2.98 ± 0.05 | M |
| 2.92 ± 0.05 | VS |

The above values for the ZSM-4 type crystalline zeolite material were determined by standard techniques. The radiation was the K-alpha doublet of copper and a scintillation counter detector. The peak heights I, and the positions as a function of two times theta, where theta is the Bragg angle, were determined by a computer associated with the spectrometer. From these readings, the relative intensities 100I/I$_O$ where I$_O$ is the intensity of the strongest line or peak, and d(OBS), the interplanar spacing in Angstroms, corresponding to the recorded lines were calculated. The relative intensities are given in terms of the following symbols: vs-very strong, s-strong, m-medium, and w-weak.

Members of the family of this zeolite can be base exchanged to remove the sodium cations by such ions as hydrogen (from acids), ammonium, and alkylammonium and arylammonium including $RNH_3$, $R_3NH+$, $R_2NH_2+$ and $R_4N+$ where R is alkyl or aryl, provided that steric hindrance does not prevent the cations from entering the cage and cavity structure of the ZSM-4 type crystalline zeolite alumino-silicate composition. The hydrogen form of the zeolite useful in such hydrocarbon conversion processes as isomerization of polysubstituted alkyl aromatics and disproportionation of alkyl aromatics, is prepared, for example, by base exchanging the sodium form with, e.g., ammonium chloride or hydroxide whereby the ammonium ion is substituted for the sodium ion. The composition is then calcined at a temperature of, e.g., 1000° F. causing evolution of ammonia and retention of a proton in the composition. Other replacing cations include cations of the metals of the Periodic Table, especially metals other than sodium, especially metals of Group IIA, e.g., zinc, and Group IIIA, IVA, IB, IIB, IIIB, IVB, VIB and Group VIII of the Periodic Table and rare earth metals and manganese.

Ion exchange of the zeolite can be accomplished conventionally, as by packing the zeolite in the form of beds in a series of vertical columns and successively passing through the beds of water solution of a soluble salt of the cation to be introduced into the zeolite; and then to change the flow from the first bed to a succeeding one as the zeolite in the first bed becomes ion exchanged to the desired extent. Aqueous solutions of mixtures of materials to replace the sodium can be employed. For instance, if desired, one can exchange the sodium with a solution containing a number of rare earth metals suitably in the chloride form. Thus, a rare earth chloride solution commercially available can be used to replace substantially all of the sodium in a synthesized ZSM-4 type of zeolite material. This commercially available rare earth chloride solution contains chlorides of rare earth mixture having the relative composition: cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides, but having a lower cerium content. It consists of the following rare earths determined as oxides: lanthanum 45-65% by weight, cerium 1-2% by weight, praseodymium 9-10% by weight, neodymium 32-33% by weight, samarium 5-7% by weight, gadolinium 3-4% by weight, yttrium 0.4% by weight, and other rare earths 1-2% by weight. It is to be understood that other mixtures of rare earths are also applicable for the preparation of the novel compositions of this invention, although lanthanum, neodymium, praseodymium, samarium and gadolinium as well as mixtures of rare earth cations containing a predominant amount of one or more of the above cations are preferred.

Base exchange with various metallic and non-metallic cations can be carried out according to the procedure described in U.S. Pat. Nos. 3,140,251, 3,140,252 and 3,140,253, the entire contents of which are incorporated herein by reference.

Regardless of the cations replacing the sodium in the synthesized form of the ZSM-4 type zeolite material, the spatial arrangement of the aluminum, silicon and oxygen atoms which form the basic crystal lattice of the ZSM-4 type zeolite material remains essentially unchanged by the described replacement of sodium or other alkali metal as determined by taking an X-ray powder diffraction pattern of the ion-exchanged material. It should be understood that this X-ray diffraction pattern is characteristic of all the species of ZSM-4 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it had been subjected to thermal treatment.

The ZSM-4 type zeolite materials of the present invention can suitably be prepared in a manner substantially similar to that of the zeolite ZSM-4, e.g., disclosed in Bowes, et al, U.S. Pat. No. 3,578,723, except that DABCO is used in the synthesis instead of tetramethyl ammonium cation.

Thus, the zeolite material of the present invention is synthesized by preparing a solution containing sources of alkali metal, alumina, silica, DABCO and water having the following composition expressed in mole ratios of oxides:

| | BROAD | PREFERRED |
|---|---|---|
| $SiO_2/AL_2O_3$ | 3-60 | 6-30 |

|  | BROAD | PREFERRED |
| --- | --- | --- |
| R/R + M | 0.01–0.98 | 0.2–0.8 |
| OH$^-$/SiO$_2$ | 0.1–1.8 | 0.2–0.8 |
| H$_2$O/OH$^-$ | 5–300 | 15–100 | wherein R is DABCO and M is an alkali metal.

The reaction mixture is maintained at a temperature of from about 75° C. to about 175° C., preferably 90° C. to above 150° C., and most preferably at 100° C. to 150° C. for 6 hours to 150 days, preferably 60 hours to 140 days. Pressure of the reaction is preferably ambient, however, it will be understood by those skilled in the art that pressure of the reaction is dependent on temperature and that under certain temperature conditions it may be higher than ambient. The composition mixture is maintained at the reaction conditions until the crystals of the zeolitic material are formed. Thereafter, the crystals are separated from the liquid in a conventional manner, e.g., by centrifuging, washed with deionized water, dried and recovered.

It will be apparent to those skilled in the art that the reaction mixture can be prepared utilizing materials other than those specified above which supply the elements of appropriate oxides. Such compositions are, e.g., sodium aluminate, alumina, sodium silicate, silica hydrosol, silica gel, silicic acid, sodium hydroxide and the appropriate nitrogen compound(s) selected from those enumerated above. It will also be apparent that each of the oxide compounds utilized in the reaction mixture can be supplied by one or more initial reactants which can be intermixed in the reaction mixture in any order. The reaction mixture can be prepared either batch-wise or continuously. If a continuous mixing method is used, the various solutions employed in the synthesis can be mixed in a mixing nozzle so as to produce a uniformly mixed solution of the respective ingredients. The mixing in a mixing nozzle precedes heating of the resultant solution and crystallization of the alumina silicate.

The ZSM-4 type of zeolite of the present invention is useful as a cracking and hydrocracking catalyst, as olefin polymerization and isomerization catalyst, and as a paraffin isomerization and disproportionation catalyst. However, in order to increase the range and stability of the zeolite of this invention it is necessary to remove the original metal ion, usually sodium. The original metal ion of most zeolites can be removed by conventional exchange procedures, e.g., by multiple consecutive exchanges, as described above. Some zeolites, including the zeolite of the present invention, are not susceptible to this method of ion exchange because the sodium content thereof reaches a plateau and remains at the plateau value regardless of the number of subsequent exchanges. It has been discovered in the prior art (e.g., U.S. Pat. No. 4,021,447) that calcination of ZSM-4 zeolite with a simultaneous removal of the tetramethyl ammonium ion "frees" the sodium ion so that it can thereafter be more easily removed. Similarly, the zeolite of the present invention can also be calcined with the simultaneous removal of the DABCO ion, thereby facilitating the removal of the sodium ion. Typical replacing cations are, e.g., hydrogen, ammonium and metal cations, including mixtures thereof. Particularly preferred are cations of hydrogen, ammonium, rare earth metals, magnesium, zinc, calcium, nickel and mixtures thereof, usually employed in the form of their salts, preferably chlorides, nitrates or sulfates.

Following the ion exchange with a salt solution of the desired replacing cation, the ZSM-4 type zeolite of this invention may be washed with water and dried at a temperature of from 150 degrees F. to about 600 degrees F., and thereafter it may be heated in air or other inert gas at a temperature ranging from about 500 to 1500 degrees F. for 1 to 48 hours, or more. The zeolites produced in this manner are also useful as cracking catalysts in cracking, hydrocracking and dewaxing operation. It is also possible to treat the zeolite of this invention with steam at temperatures of from about 800 degrees F. to about 1400 degrees F., preferably 1000 degrees F. to 1200 degrees F. The steam treatment is suitably conducted in reaction atmospheres consisting partially or entirely of steam. The zeolite may also be treated at lower temperatures and at elevated pressures, e.g., at about 350 degrees F. to about 700 degrees F. and at about 10 to about 200 atmospheres.

The ZSM-4 type of zeolite material of this invention may also be used in the form of a porous matrix. The zeolite can be combined, dispersed, or otherwise intimately mixed with a porous matrix in such proportions that the resulting product composition contains from about 1% to about 95% by weight, and preferably from about 1 to about 70% by weight of the zeolite of this invention in the final composite.

The porosity of the compositions employed as a matrix can either be inherent in the particular material or it can be imparted thereto by mechanical or chemical means. The inorganic matrix is formed preferably from inorganic compositions of a siliceous nature. Particularly preferred are organic oxides, such as clay, chemically treated clay, alumina, silica, silica-alumina, etc., because of their superior porosity, attrition resistance and stability. Techniques for incorporating zeolites, which apply to the present zeolite, in a matrix, are conventional and well known in the art and they are set forth in detail, e.g., in U.S. Pat. Nos. 3,140,249 and 3,578,723, the entire contents of which are incorporated herein by reference.

The following examples illustrate with more particularity the present invention. However, it is to be understood that these examples are merely illustrative in nature and the scope of the invention is not limited thereby.

EXAMPLES 1–4

Table 3 below summarizes the reagents and conditions used in preparing the ZSM-4 type of crystalline zeolite of the present invention. As summarized in that table, the synthesis process employs sodium aluminate, sodium hydroxide solution, DABCO and colloidal silica. The amounts of each of the components are given below for each example. In synthesizing each product of Examples 1–4, the A, B and C solutions were prepared separately, mixed together, and stirred vigorously for from 15 to 20 minutes before heating. Crystallization was carried out in a sealed plastic jar under static conditions and under atmospheric pressure. The crystalline products were separated from the reaction mixture by filtering and washing with water until the zeolite was substantially free of anions. All proportions in Table 3 below are in grams, and all temperatures, unless otherwise indicated, in degrees Centigrade.

TABLE 3
Preparation of ZSM-4 Type Zeolite

| Example | 1 | 2 | 3 | 4 |
|---|---|---|---|---|
| Starting Materials | | | | |
| A. Sodium Aluminate Solution (43.3% $Al_2O_3$, 32.2% $Na_2O$, 25.6% $H_2O$) | 21.6 | 21.6 | 21.6 | 43.2 |
| 50% NaOH solution | 12.9 | 8.9 | 12.9 | 25.8 |
| $H_2O$ | 65.0 | 65.0 | 65.0 | 130.0 |
| B. DABCO (Diazabicyclooctane) | 25.0 | 25.0 | 25.0 | 50.0 |
| C. Colloidal Silica (30% $SiO_2$, 70% $H_2O$) | 174.0 | 174.0 | 174.0 | 348.0 |
| Starting Gel Composition (molar ratio) | | | | |
| $\frac{SiO_2}{Al_2O_3}$ | 9.5 | 9.5 | 9.5 | 9.5 |
| $\frac{R}{R+M}$ | 0.36 | 0.39 | 0.36 | 0.36 |
| $\frac{OH^-}{SiO_2}$ | 0.44 | 0.38 | 0.44 | 0.44 |
| $\frac{H_2O}{OH^-}$ | 27.9 | 31.8 | 27.9 | 27.9 |
| Crystallization Conditions | | | | |
| Temperature (degrees C.) | 100 | 100 | 100 | 100 |
| Time (days) | 133 | 147 | 146 | 125 |
| X-ray Analysis | ZSM-4 Highly Crystalline w/Mordenite and Phillipsite trace | ZSM-4 + Mordenite | ZSM-4 105% | ZSM-4 95% |
| Product Composition (weight %) | | | | |
| C | N.A. | N.A. | 3.55 | 3.30 |
| N | 1.41 | 1.18 | 1.56 | 1.27 |
| Na | 6.51 | 5.20 | 5.40 | 5.50 |
| $Al_2O_3$ | 17.0 | 15.4 | 13.3 | 14.1 |
| $SiO_2$ | 65.8 | 74.2 | 59.9 | 59.6 |
| Ash | 90.1 | 83.8 | 82.8 | 83.5 |
| $SiO_2/Al_2O_3$ | 6.6 | 8.2 | 7.7 | 7.2 |

R is 
$$N \underset{CH_2-CH_2}{\overset{CH_2-CH_2}{\underset{}{\diagdown}\!\!\!\diagup}} N$$
with $CH_2-CH_2$ bridges M is alkali metal The product of Example 1 had the following X-ray diffraction pattern:

| Line Number | 2 Theta | d(A) | I/Io |
|---|---|---|---|
| 1 | 5.60 | 15.78 | 29 |
| 2 | 6.51 | 13.59 | 1* |
| 3 | 7.42 | 11.91 | 2 |
| 4 | 8.79 | 10.05 | 1* |
| 5 | 9.71 | 9.11 | 68 |
| 6 | 11.22 | 7.89 | 33 |
| 7 | 11.52 | 7.68 | 1 |
| 8 | 12.48 | 7.09 | 7* |
| 9 | 12.84 | 6.89 | 48 |
| 10 | 13.46 | 6.58 | 6* |
| 11 | 14.84 | 5.97 | 46 |
| 12 | 15.34 | 5.78 | 3* |
| 13 | 16.13 | 5.50 | 17 |
| 14 | 16.85 | 5.26 | 31 |
| 15 | 17.70 | 5.01 | 6* |
| 16 | 18.86 | 4.70 | 50 |
| 17 | 19.67 | 4.51 | 5* |
| 18 | 20.29 | 4.38 | 4 |
| 19 | 20.64 | 4.30 | 2 |
| 20 | 21.63 | 4.11 | 10* |
| 21 | 22.23 | 4.00 | 6* |
| 22 | 22.54 | 3.94 | 19 |
| 23 | 23.42 | 3.80 | 84 |
| 24 | 23.92 | 3.72 | 45 |
| 25 | 24.59 | 3.62 | 50 |
| 26 | 25.24 | 3.53 | 100 |
| 27 | 25.73 | 3.46 | 11* |
| 28 | 25.87 | 3.44 | 30 |
| 29 | 26.28 | 3.39 | 4* |
| 30 | 27.28 | 3.27 | 3 |
| 31 | 27.74 | 3.22 | 8* |
| 32 | 28.28 | 3.16 | 95 |
| 33 | 28.84 | 3.10 | 37 |
| 34 | 29.41 | 3.04 | 39 |
| 35 | 29.97 | 2.982 | 25 |
| 36 | 30.63 | 2.919 | 87 |
| 37 | 30.94 | 2.890 | 6* |
| 38 | 31.33 | 2.855 | 4 |
| 39 | 31.56 | 2.835 | 6 |
| 40 | 33.38 | 2.684 | 5* |
| 41 | 33.72 | 2.658 | 19 |
| 42 | 34.08 | 2.631 | 11 |
| 43 | 34.54 | 2.597 | 1 |
| 44 | 35.06 | 2.559 | 1 |
| 45 | 35.62 | 2.521 | 19* |
| 46 | 36.12 | 2.487 | 6 |
| 47 | 36.59 | 2.456 | 2 |
| 48 | 36.93 | 2.434 | 1 |
| 49 | 37.49 | 2.399 | 5 |
| 50 | 37.81 | 2.379 | 10 |
| 51 | 38.36 | 2.347 | 4 |
| 52 | 39.57 | 2.278 | 14 |
| 53 | 41.24 | 2.189 | 2 |
| 54 | 41.69 | 2.166 | 4 |
| 55 | 42.16 | 2.143 | 7 |
| 56 | 42.97 | 2.105 | 4 |

-continued

| Line Number | 2 Theta | d(A) | I/Io |
|---|---|---|---|
| 57 | 43.43 | 2.083 | 1 |
| 58 | 44.48 | 2.037 | 4 |
| 59 | 44.96 | 2.016 | 3 |
| 60 | 45.66 | 1.987 | 8 |
| 61 | 46.00 | 1.973 | 4 |
| 62 | 46.48 | 1.954 | 8 |
| 63 | 46.84 | 1.940 | 5 |
| 64 | 47.28 | 1.922 | 3 |
| 65 | 47.50 | 1.914 | 12 |
| 66 | 47.96 | 1.897 | 11 |
| 67 | 48.61 | 1.873 | 3 |
| 68 | 50.05 | 1.822 | 8 |
| 69 | 50.84 | 1.796 | 2 |
| 70 | 51.48 | 1.775 | 2 |
| 71 | 51.85 | 1.763 | 3 |
| 72 | 52.24 | 1.751 | 13 |
| 73 | 53.20 | 1.722 | 4 |
| 74 | 54.33 | 1.688 | 2 |
| 75 | 55.30 | 1.661 | 6 |
| 76 | 55.53 | 1.655 | 8 |
| 77 | 56.20 | 1.637 | 4 |
| 78 | 57.52 | 1.602 | 6 |
| 79 | 58.81 | 1.570 | 6 |

*Intensity due wholly or in part to impurity phases such as mordenite and phillipsite.

EXAMPLES 5-6

Two portions of the material of Examples 1 and 4, respectively, were subjected to a base exchange with ammonium chloride to obtain hydrogen form of the zeolite. The base exchange was preceded in both cases by calcination of the samples for 10 hours at 538 degrees C. Subsequently, each of the calcined samples was subjected to five (5) one (1) hour base exchanges with a 10% solution of $NH_4Cl$ at 85 degrees C. The samples were then filtered, washed and dried. The results of the analysis of the samples are summarized below.

| Example No. | 5 | 6 |
|---|---|---|
| Starting material obtained from example number | 1 | 4 |
| Sodium (Na) content (Weight %) | 0.01 | 0.02 |
| Surface area (m²/gr) | 427 | 503 |
| α-test (at 538 degrees C.) αValue | 11.4 | 52 |
| Oligomerization Temperature (°F.) | 700 | 700 |
| weight hourly space velocity (WHSV) | 6.9 | 6.6 |
| % Conversion | 18.2 | 1.4 |
| Methanol Conversion Temperature (°F.) | 700 | |
| WHSV | 2.8 | |
| wt. % conversion | 75.1 | |
| wt. % Ca | 26.3 | |
| wt. % $C_{5+}$ | 22.7 | |
| wt. % Coke | 11.8 | |

The alpha-test (α-test) is an indication of the relative catalytic cracking activity of the catalyst compared to a standard catalyst. The value of α is the relative rate constant (rate of n-hexane conversion per unit volume of oxides composition per unit time). It is based on the activity of highly active silica-alumina cracking catalyst taken as $\alpha = 1$.

The α-test is further described in a letter to the editor, entitled "Superactive Crystalline Alumino-Silicate Hydrocarbon Cracking Catalysts", by P. B. Weisz and J. N. Miale, Journal of Catalysis, Vol. 4, pp. 527–529 (August 1965) and in U.S. Pat. No. 3,354,078.

It will be apparent to those skilled in the art that the above examples can be successfully repeated with ingredients and under conditions equivalent to those set forth above.

From the foregoing specification, one skilled in the art can readily ascertain the essential features of this invention and without departing from the spirit and scope thereof can adapt it to various alternative applications.

What is claimed is:

1. In a process of producing a ZSM-4 type synthetic crystalline aluminosilicate zeolite having the X-ray diffraction pattern of Table 1, which comprises preparing a reaction mixture comprised of sources of alkali metal, alumina, silica, at least one organic nitrogen-containing compound and water, and maintaining said mixture under crystallization conditions until crystals and said zeolite are formed, the improvement wherein said at least one organic nitrogen-containing compound is triethylenediamine.

2. In a reaction mixture comprised of sources of alkali metal, alumina, silica, at least one organic nitrogen-containing compound and water, which upon crystallization yields a synthetic crystalline aluminosilicate zeolite having the X-ray diffraction pattern of Table 1, the improvement wherein said at least one organic nitrogen-containing compound is triethylenediamine.

* * * * *

UNITED STATES PATENT AND TRADEMARK OFFICE
CERTIFICATE OF CORRECTION

PATENT NO. : 4,331,643
DATED : May 25, 1982
INVENTOR(S) : Mae K. Rubin and Edward J. Rosinski It is certified that error appears in the above—identified patent and that said Letters Patent is hereby corrected as shown below:

| | |
|---|---|
| Title Page, Title | "DIAZOBICYCLOOCTANE" should be --DIAZABICYCLOOCTANE--. |
| Title Page, Abstract, Line 2 | "1,4-diazobicyclo" should be --1,4-diazabicyclo--. |
| Column 1, Title | "DIAZOBICYCLOOCTANE" should be --DIAZABICYCLOOCTANE--. |
| Column 2, line 42 | "difraction" should be --diffraction--. |
| Column 2, line 52 | Formula should be $--0.9 \pm 0.2 M_{2/n}O:Al_2O_3:3-20\ BO_2:zH_2O--$. |
| Column 3, line 47 | Delete hyphen in "alumino-silicate". |
| Column 10, line 40 | "and" should be --of--. |

Signed and Sealed this

Tenth Day of August 1982

[SEAL]

Attest:

GERALD J. MOSSINGHOFF

Attesting Officer

Commissioner of Patents and Trademarks